US011587343B2

United States Patent
Zhang et al.

(10) Patent No.: US 11,587,343 B2
(45) Date of Patent: Feb. 21, 2023

(54) METHOD AND SYSTEM FOR CONVERTING FONT OF CHINESE CHARACTER IN IMAGE, COMPUTER DEVICE AND MEDIUM

(71) Applicant: BOE TECHNOLOGY GROUP CO., LTD., Beijing (CN)

(72) Inventors: Lijie Zhang, Beijing (CN); Guannan Chen, Beijing (CN); Hanwen Liu, Beijing (CN); Dan Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 245 days.

(21) Appl. No.: 17/044,275

(22) PCT Filed: Apr. 20, 2020

(86) PCT No.: PCT/CN2020/085696
§ 371 (c)(1),
(2) Date: Sep. 30, 2020

(87) PCT Pub. No.: WO2020/228493
PCT Pub. Date: Nov. 19, 2020

(65) Prior Publication Data
US 2021/0271939 A1   Sep. 2, 2021

(30) Foreign Application Priority Data
May 16, 2019 (CN) .......................... 201910405777.9

(51) Int. Cl.
*G06V 30/244* (2022.01)
*G06F 40/109* (2020.01)
(Continued)

(52) U.S. Cl.
CPC .......... *G06V 30/245* (2022.01); *G06F 40/109* (2020.01); *G06V 30/347* (2022.01); *G06V 30/287* (2022.01)

(58) Field of Classification Search
CPC .. G06V 30/245; G06V 30/347; G06V 30/287; G06F 40/109
(Continued)

(56) References Cited

U.S. PATENT DOCUMENTS

2019/0147336 A1*   5/2019   Yu .......................... G06V 10/82
706/15

FOREIGN PATENT DOCUMENTS

| CN | 101308578 A | 11/2008 |
| CN | 101551724 A | 10/2009 |

(Continued)

OTHER PUBLICATIONS

Lian et al., Automatic generation of Large-Scale Handwriting Font Via Style Learning, Nov. 2016, Association for Computing Machinery (Year: 2016).*

(Continued)

*Primary Examiner* — Wednel Cadeau
(74) *Attorney, Agent, or Firm* — McCoy Russell LLP (57) ABSTRACT

A method and a system for converting a font of a Chinese character in an image, a computer device and a medium are disclosed. A specific implementation of the method includes: acquiring a stroke of a to-be-converted Chinese character in the image and spatial distribution information of the stroke; and generating a Chinese character in a target font that corresponds to the to-be-converted Chinese character in the image according to the stroke of the to-be-converted Chinese character, the spatial distribution information of the stroke and standard stroke information of the target font, to replace the to-be-converted Chinese character.

18 Claims, 4 Drawing Sheets

(51) Int. Cl.
  *G06V 30/32* (2022.01)
  *G06V 30/28* (2022.01)
(58) Field of Classification Search
  USPC .......................................................... 382/182
  See application file for complete search history.

(56) References Cited

FOREIGN PATENT DOCUMENTS

| | | |
|---|---|---|
| CN | 101819683 A | 9/2010 |
| CN | 102346558 A | 2/2012 |
| CN | 105718965 A | 6/2016 |
| CN | 107292936 A | 10/2017 |
| CN | 107577651 A | 1/2018 |
| CN | 107644006 A | 1/2018 |
| CN | 108170649 A | 6/2018 |
| CN | 108764054 A | 11/2018 |
| CN | 108804397 A | 11/2018 |
| CN | 109064522 A | 12/2018 |
| CN | 109190722 A | 1/2019 |
| CN | 109635883 A | 4/2019 |
| CN | 110135530 A | 8/2019 |
| EP | 0457534 A3 | 8/1993 |
| WO | WO-2014200736 A1 * | 12/2014 ............. G06F 3/018 |

OTHER PUBLICATIONS

Lian, Z. et al., "Automatic Generation of Large-scale Handwriting Fonts via Style Learning," Proceedings of the Special Interest Group on Computer Graphics (SA '16: SIGGRAPH ASIA 2016 Symposium on Visualization), Dec. 5, 2016, Macao, 4 pages.

ISA China National Intellectual Property Administration, International Search Report and Written Opinion Issued in Application No. PCT/CN2020/085696, dated Jul. 21, 2020, WIPO, 16 pages. (Submitted with Partial Translation).

State Intellectual Property Office of the People's Republic of China, Office Action and Search Report Issued in Application No. 201910405777.9, dated Oct. 29, 2020, 19 pages. (Submitted with Partial Translation).

* cited by examiner

METHOD AND SYSTEM FOR CONVERTING FONT OF CHINESE CHARACTER IN IMAGE, COMPUTER DEVICE AND MEDIUM

CROSS-REFERENCE TO RELATED APPLICATION

The present application is a U.S. National Phase of International Patent Application No. PCT/CN2020/085696 entitled "METHOD AND SYSTEM FOR CONVERTING FONT OF CHINESE CHARACTER IN IMAGE, COMPUTER DEVICE AND MEDIUM," filed on Apr. 20, 2020. International Patent Application No. PCT/CN2020/085696 claims priority to Chinese Patent Application No. 201910405777.9 filed in China on May 16, 2019. The entire contents of each of the above-referenced applications are hereby incorporated by reference for all purposes.

TECHNICAL FIELD

The present disclosure relates to the field of image processing technology, in particular to a method and a system for converting a font of a Chinese character in an image, a computer device and a medium.

BACKGROUND AND SUMMARY

Characters are the cornerstone to the dissemination and accumulation of culture and knowledge. With the development of society, more and more personalized, individualized and customized fonts need to be designed, especially in such industry as graphic design and advertisement.

The present disclosure provides in a first aspect a method for converting a font of a Chinese character in an image. The method includes: acquiring a stroke of a to-be-converted Chinese character in the image and spatial distribution information of the stroke; and generating a Chinese character in a target font that corresponds to the to-be-converted Chinese character in the image according to the stroke of the to-be-converted Chinese character, the spatial distribution information of the stroke and standard stroke information of the target font to replace the to-be-converted Chinese character.

Optionally, prior to acquiring the stroke of the to-be-converted Chinese character in the image and the spatial distribution information of the stroke, the method further includes: converting the to-be-converted Chinese character in the image into a to-be-converted Chinese character in a standard font.

Optionally, the method further includes: generating an image including the standard stroke information of the target font by using a deep learning network to obtain the standard stroke information of the target font.

Optionally, the acquiring the stroke of the to-be-converted Chinese character in the image and the spatial distribution information of the stroke further includes: calculating a correlation degree between each region in the image and a standard stroke of the standard font sequentially in a descending order of a complexity of the standard stroke of the standard font, and matching and identifying the stroke of the to-be-converted Chinese character in the image and the spatial distribution information of the stroke according to the correlation degree, wherein when a stroke is being identified, a pixel value of a region corresponding to a previous identified stroke is set to zero.

Optionally, the calculating the correlation degree between each region in the image and the standard stroke of the standard font sequentially further includes: calculating the correlation degree between each region in the image and the standard stroke of the standard font sequentially according to image blocks of different rotation angles and different sizes.

Optionally, the matching and identifying the stroke of the to-be-converted Chinese character in the image and the spatial distribution information of the stroke according to the correlation degree includes: for any region in the image, determining that the region includes the standard stroke of the standard font in a case that the correlation degree between the region and the standard stroke of the standard font is greater than a preset threshold; and determining that the standard stroke of the standard font and the spatial distribution information of the standard stroke are the stroke of the to-be-converted Chinese character in the region and the spatial distribution information of the stroke.

Optionally, the generating the Chinese character in the target font that corresponds to the to-be-converted Chinese character in the image according to the stroke of the to-be-converted Chinese character, the spatial distribution information of the stroke, and the standard stroke information of the target font further includes: according to the stroke of the to-be-converted Chinese character and a quantity of strokes and a matching and identifying sequence of the strokes, selecting a corresponding stroke from the standard stroke information of the target font and generating the Chinese character in the target font that corresponds to the to-be-converted Chinese character in the image according to the spatial distribution information of the stroke.

Optionally, the generating the Chinese character in the target font that corresponds to the to-be-converted Chinese character in the image according to the spatial distribution information of the stroke includes: acquiring the standard stroke of the target font corresponding to the stroke of the to-be-converted Chinese character sequentially according to the matching and identifying sequence; and placing, according to the spatial distribution information of the stroke of the to-be-converted Chinese character, the corresponding standard stroke of the target font in the image, to obtain the Chinese character in the target font that corresponds to the to-be-converted Chinese character.

Optionally, the spatial distribution information of the stroke includes: starting point coordinate information, size information and direction information of the stroke.

Optionally, subsequent to acquiring the stroke of the to-be-converted Chinese character in the image and the spatial distribution information of the stroke, the method further includes: representing the to-be-converted Chinese character as a two-dimensional vector, wherein the stroke of the to-be-converted Chinese character and the spatial distribution information of the stroke are used as a first-dimensional vector of the to-be-converted Chinese character, and the quantity and the matching and identifying sequence of the strokes of the to-be-converted Chinese character are used as a second-dimensional vector of the to-be-converted Chinese character.

Optionally, the generating the image including the standard stroke information of the target font by using the deep learning network further includes: acquiring the deep learning network by using a plurality of images including different Chinese characters in the target font as training samples; and inputting an image including a standard stroke of the standard font to the deep learning network to obtain the image including the standard stroke information of the target font.

Optionally, the deep learning network is a generative adversarial network.

The present disclosure provides in a second aspect a system for converting a font of a Chinese character in an image. The system implements the method provided in the first aspect of the present disclosure and includes: a character structure acquisition circuit, configured to acquire a stroke of a to-be-converted Chinese character in the image and spatial distribution information of the stroke; and a font conversion circuit, configured to generate a Chinese character in a target font that corresponds to the to-be-converted Chinese character in the image according to the stroke of the to-be-converted Chinese character, the spatial distribution information of the stroke and standard stroke information of the target font to replace the to-be-converted Chinese character.

The present disclosure provides in a third aspect a computer device. The computer device includes: a memory, a processor, and a computer program stored in the memory and configured to be executed by the processor, the processor is configured to execute the computer program to implement the method provided in the first aspect of the present disclosure.

The present disclosure provides in a fourth aspect a computer-readable storage medium storing therein a computer program, the computer program is configured to be executed by a processor to implement the method provided in the first aspect of the present disclosure.

BRIEF DESCRIPTION OF THE DRAWINGS

The specific embodiments of the present disclosure will be described in detail below with reference to the accompanying drawings.

DETAILED DESCRIPTION

To describe the present disclosure more clearly, the present disclosure will be further described hereinafter in conjunction with optional embodiments and the drawings. In the drawings, similar components are denoted with a same reference numeral. It should be appreciated by a person skilled in the art that the description below is illustrative, rather than limitative, and shall not be construed as limiting the scope of the present disclosure.

Due to the large quantity of Chinese characters, it takes a lot of labor and time to design a complete set of new font. Therefore, it is necessary to provide a method and a system for converting a font of a Chinese character in an image, a computer device and a medium.

Figure 1:
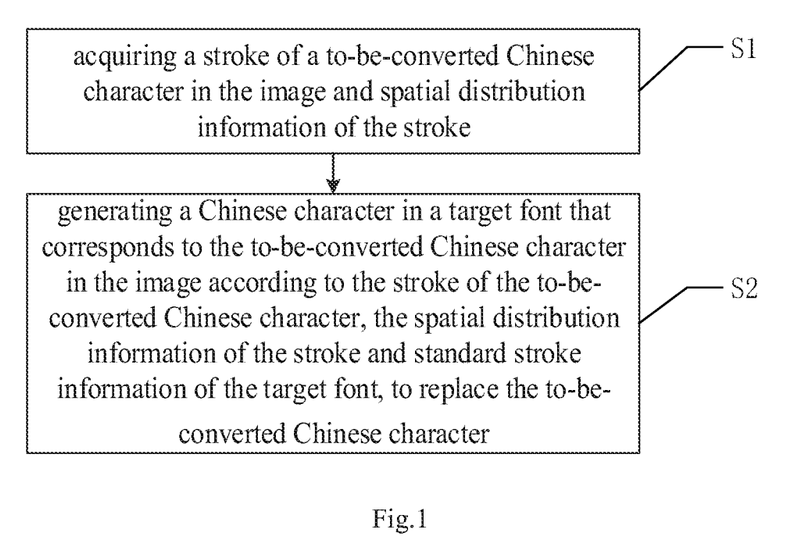
FIG. 1 is a flow chart illustrating a method for converting a font of a Chinese character in an image according to an embodiment of the present disclosure.

As shown in FIG. 1, a method for converting a font of a Chinese character in an image is provided in an embodiment of the present disclosure. The method includes the following steps.

S1, acquiring a stroke of a to-be-converted Chinese character in the image and spatial distribution information of the stroke.

That is, such information as which strokes the to-be-converted Chinese character is composed of, position distribution in the image and sizes of these strokes is acquired.

S2, generating a Chinese character in a target font that corresponds to the to-be-converted Chinese character in the image according to the stroke of the to-be-converted Chinese character, the spatial distribution information of the stroke and standard stroke information of the target font, to replace the to-be-converted Chinese character.

In the method of the embodiment, a font structure of the to-be-converted Chinese character in the image may be analyzed to acquire the stroke of the to-be-converted Chinese character and the spatial distribution information of the stroke, and the Chinese character in the target font that corresponds to the to-be-converted Chinese character in the image is generated according to the standard stroke information of a pre-designed target font, thereby realizing the font conversion of the Chinese character in the image automatically. The Chinese character in the image may be converted to a Chinese character in a personalized new font. The timeliness and effectiveness of the font conversion are high, and the labor and time cost of acquiring the Chinese character in the personalized new font may be greatly reduced.

Figure 2:
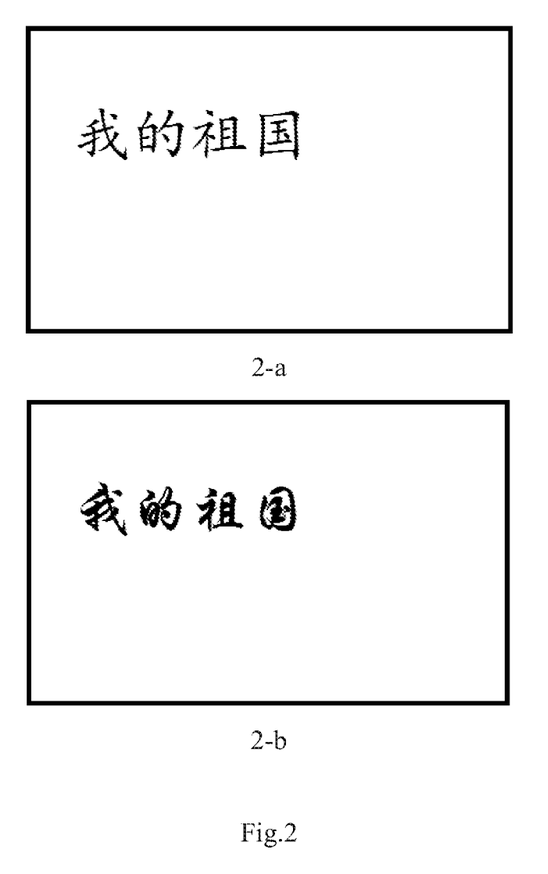
FIG. 2 illustrates in 2-a an example of an image including a to-be-converted Chinese character, and illustrates in 2-b an example of an image after font conversion.

In a specific example, as shown in FIG. 2, 2-a shows an example of an image including a to-be-converted Chinese character, wherein a font of the to-be-converted Chinese character is regular script among standard fonts, and 2-b shows an image after the font conversion. After the font conversion, spatial distribution of each Chinese character in the image remains unchanged. To be specific, starting point coordinate, size, and direction of each stroke in each Chinese character remain basically unchanged, but may vary slightly with different fonts.

In some optional implementations of the embodiment, prior to acquiring the stroke of the to-be-converted Chinese character in the image and the spatial distribution information of the stroke, the method further includes: converting the to-be-converted Chinese character in the image into a to-be-converted Chinese character in a standard font.

This implementation may be used in a case that the to-be-converted Chinese character in the image is in a special font, so as to avoid a decrease of accuracy of acquiring the stroke and the spatial distribution information of the stroke due to the fact that the to-be-converted Chinese character in an original image is in the special font, thereby enhancing the universality of the method in the embodiment.

In some optional implementations of the embodiment, the method further includes: generating an image including the standard stroke information of the target font by using a deep learning network to obtain the standard stroke information of the target font.

In this implementation, the standard stroke information of the target font may be acquired quickly and easily by using the deep learning network.

In some optional implementations of the embodiment, the generating the image including the standard stroke information of the target font by using the deep learning network further includes: acquiring the deep learning network by using a plurality of images including different Chinese characters in the target font as training samples; and inputting an image including a standard stroke of the standard font to the deep learning network to obtain the image including the standard stroke information of the target font.

In this implementation, a deep learning network for font learning may be acquired by training a small quantity of training samples, thereby realizing a quick, simple and convenient acquisition of the standard stroke information of the target font.

In some optional implementations of the embodiment, the deep learning network is a generative adversarial network. The generative adversarial network is suitable for image style transfer. In the image field, it has been able to generate an enough convincing image.

In a specific example, a standard regular script font is used as a basis for character structure analysis in this embodiment. By using Chinese characters in a small quantity of images including different Chinese characters in the target font as a basis of target font style, and using a deep learning method of style transfer, characteristics of the target font is learned. Then, by using a trained deep learning network (or a style transfer network), with an input of the deep learning network being an image including a Chinese character in the regular script font, or in another word, with an input of the deep learning network being a standard stroke of the regular script font included by the image including a Chinese character in the regular script font, the image including the standard stroke information of the target font is generated, to acquire the standard stroke information of the target font to be used in subsequent steps to reconstruct a Chinese character in the target font the corresponds to the to-be-converted Chinese character.

To be specific, because the Chinese character is a combination of "shape, sound, and meaning", an important feature of the Chinese character is that the Chinese character has a characteristic of character shape, and each Chinese character is composed of basic strokes such as dot stroke, horizontal stroke, vertical stroke, left-falling stroke and right-falling stroke. Therefore, generally, a target Chinese character may be generated if a segmentation of the basic strokes comprising the Chinese character and a structure of the Chinese character are known. However, it is difficult for a user to intuitively determine whether a font is a font the user wishes to choose merely based on these strokes. Therefore, a character style of the font is selected as a basis for font selection in this embodiment. By using a small quantity of character samples of a target style (i.e., a small quantity of images including different Chinese characters in the target font) as training samples, a deep learning network that may represent the target style is trained through a deep learning method, which is similar to an application of the deep learning network in the field of artistic image synthesis. The trained deep learning network has a characteristic of converting the standard stroke of the standard font included in the Chinese character of the standard font into the standard stroke of the target font of a desired style. Then the image including the Chinese character in the standard font (e.g., the regular script) is inputted to the deep learning network to generate the image including the standard stroke information of the target font.

In some optional implementations of the embodiment, the acquiring the stroke of the to-be-converted Chinese character in the image and the spatial distribution information of the stroke further includes: calculating a correlation degree between each region in the image and a standard stroke of the standard font sequentially in a descending order of a complexity of the standard stroke of the standard font, and matching and identifying the stroke of the to-be-converted Chinese character in the image and the spatial distribution information of the stroke according to the correlation degree, wherein, when a stroke is being identified, a pixel value of a region corresponding to a previous identified stroke is set to zero.

In this implementation, the stroke of the to-be-converted Chinese character in the image and the spatial distribution information of the stroke may be acquired quickly and accurately through the matching with the standard stroke of the standard font based on the correlation degree.

In some optional implementations of the embodiment, the calculating the correlation degree between each region in the image and the standard stroke of the standard font sequentially further includes: calculating the correlation degree between each region in the image and the standard stroke of the standard font sequentially according to image blocks of different rotation angles and different sizes.

In some optional implementations of the embodiment, the matching and identifying the stroke of the to-be-converted Chinese character in the image and the spatial distribution information of the stroke according to the correlation degree further includes: for any region in the image, determining that the region includes the standard stroke of the standard font in a case that the correlation degree between the region and the standard stroke of the standard font is greater than a preset threshold; and determining that the standard stroke of the standard font and the spatial distribution information of the standard stroke are the stroke of the to-be-converted Chinese character in the region and the spatial distribution information of the stroke.

In a specific example, although a structural relationship of the character may be established manually, due to the extremely large quantity of Chinese characters, a lot of labor and time cost is required in a manual establishment method. Therefore, an image matching method is used to analyze a spatial relationship of the character structure in this embodiment. It should be appreciated that, a shape of a same stroke may not necessarily be exactly the same. For example, "a horizontal stroke" may have different scales such as a long horizontal stroke and a short horizontal stroke. Therefore, different scales are used in the analysis of the character stroke structure in this embodiment. In addition, since some complex basic strokes may be composed of some simple basic strokes, for example, "a horizontal turning stroke" is composed of two basic strokes, i.e., "the horizontal stroke" and "the vertical stroke", when analyzing the character structure information in this embodiment, an image matching and identification is started from a more complex basic stroke, and only when the image matching for the more complex basic stroke fails, simple basic strokes are successively matched with.

Figure 3:
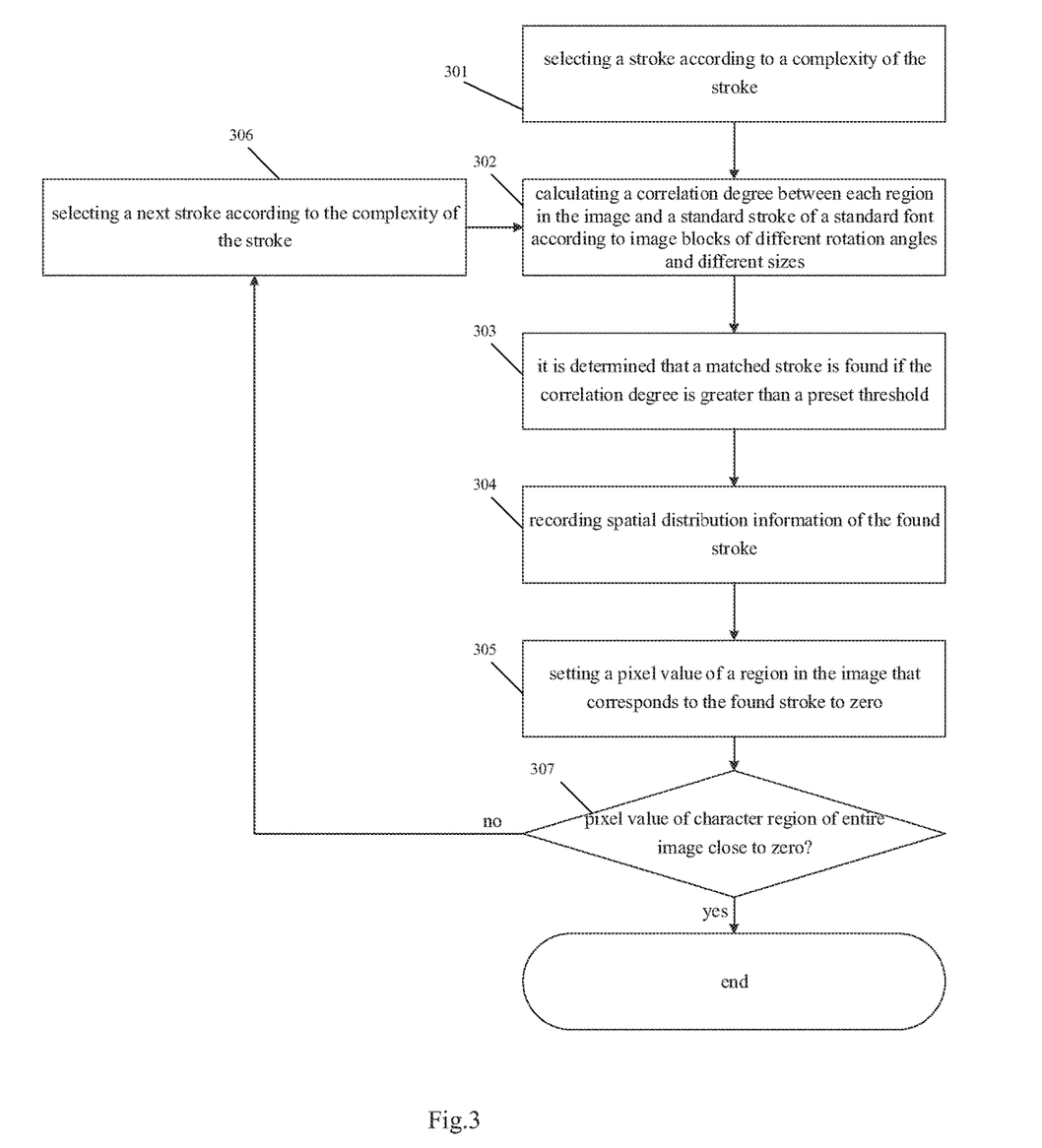
FIG. 3 is a flow chart illustrating a process of acquiring a stroke of the to-be-converted Chinese character in the image and spatial distribution information of the stroke.

As shown in FIG. 3, an entire matching and identification process is performed in different sub-region of a character region of the entire image, and includes the following steps: Step 301, selecting a stroke according to a complexity of the stroke; Step 302, calculating a correlation degree between an image block and a standard stroke of a standard font according to different rotation angles (which is optionally set to be smaller than 30°) and scales; Step 303, it is considered that a matched stroke is found if the correlation degree is greater than a preset threshold; Step 304, recording spatial distribution information of the found stroke, such as coordinate, scale and direction; Step 305, setting a pixel value of a region corresponding to the stroke to zero (similar to erasing the stroke); Step 306, selecting a next stroke according to the complexity of the stroke; Step 307, iterating through the above steps until a pixel value of the character region of the entire image is close to zero, at this point, it means that the entire to-be-converted Chinese character has been represented by the basic strokes, and all the strokes of the to-be-converted Chinese character and the spatial distribution information of all the strokes have been acquired.

In some optional implementations of the embodiment, the generating the Chinese character in the target font that corresponds to the to-be-converted Chinese character in the image according to the stroke of the to-be-converted Chinese character, the spatial distribution information of the stroke, and the standard stroke information of the target font further includes: according to the stroke (or a stroke name) of the to-be-converted Chinese character and a quantity of strokes and a matching and identifying sequence of the strokes, selecting a corresponding stroke from the standard stroke information of the target font, and generating the Chinese character in the target font that corresponds to the to-be-converted Chinese character in the image according to the spatial distribution information of the stroke.

In some optional implementations of the embodiment, the generating the Chinese character in the target font that corresponds to the to-be-converted Chinese character in the image according to the spatial distribution information of the stroke includes: acquiring the standard stroke of the target font corresponding to the stroke of the to-be-converted Chinese character sequentially according to the matching and identifying sequence; and placing, according to the spatial distribution information of the stroke of the to-be-converted Chinese character, the corresponding standard stroke of the target font in the image, to obtain the Chinese character in the target font that corresponds to the to-be-converted Chinese character In some optional implementations of the embodiment, the spatial distribution information of the stroke includes: starting point coordinate information, size information and direction information of the stroke.

In some optional implementations of the embodiment, subsequent to acquiring the stroke of the to-be-converted Chinese character in the image and the spatial distribution information of the stroke, the method further includes: representing the to-be-converted Chinese character as a two-dimensional vector, wherein the stroke of the to-be-converted Chinese character and the spatial distribution information of the stroke are used as a first-dimensional vector of the to-be-converted Chinese character, and the quantity and the matching and identifying sequence of the strokes of the to-be-converted Chinese character are used as a second-dimensional vector of the to-be-converted Chinese character.

In a specific example, through the previous steps, the stroke representation of the to-be-converted Chinese character is extracted, and the standard stroke information of the target font is also acquired. In this step, subsequent to acquiring the stroke of the to-be-converted Chinese character in the image and the spatial distribution information of the stroke, the to-be-converted Chinese character is represented as a two-dimensional vector. A first-dimensional vector is stroke attribute including the stroke (or stroke name) and the spatial distribution information of the stroke. A second-dimensional vector includes the quantity and the matching and identifying sequence of the strokes, where the quantity of strokes for different characters may be different, thus a length of the second-dimensional vector of the two-dimensional vector is not fixed. Then, according to the matching and identifying sequence in the second-dimensional vector, a corresponding stroke may be selected from the standard stroke information of the target font in accordance with the stroke name included in the first-dimensional vector, and the corresponding stroke may be generated in the image according to the spatial distribution information of the stroke included in the first-dimensional vector, thereby finally acquiring an image in which the to-be-converted Chinese character in an original font is replaced by the Chinese character in the target font.

In a specific example, converting the to-be-converted Chinese character in the image into the to-be-converted Chinese character in the standard font may be implemented based on image identification technology in the related art combined with natural language processing technology.

Figure 4:
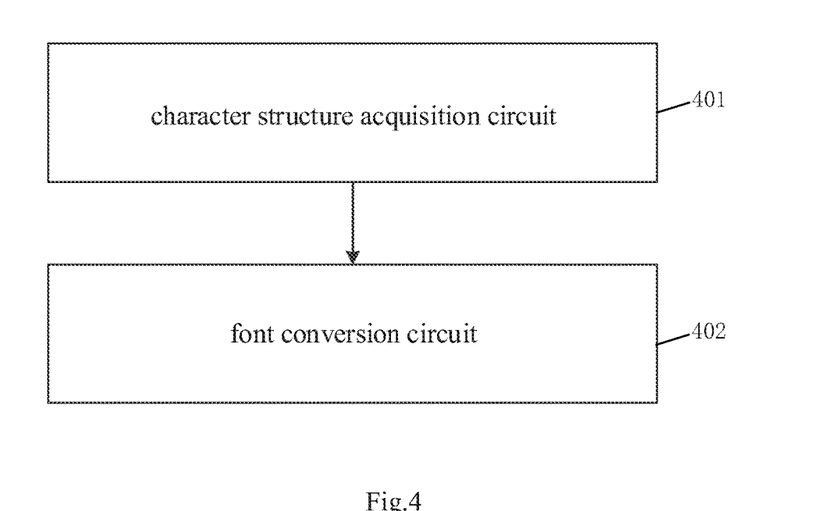
FIG. 4 is a schematic diagram of a system for converting a font of a Chinese character in an image according to an embodiment of the present disclosure.

As shown in FIG. 4, another embodiment of the present disclosure provides a system for converting the font of the Chinese character in the image. The system implements the above-mentioned method and includes: a character structure acquisition circuit 401, configured to acquire a stroke of a to-be-converted Chinese character in the image and spatial distribution information of the stroke; and a font conversion circuit 402, configured to generate a Chinese character in a target font that corresponds to the to-be-converted Chinese character in the image according to the stroke of the to-be-converted Chinese character, the spatial distribution information of the stroke and standard stroke information of the target font to replace the to-be-converted Chinese character.

It should be appreciated that, the principle and operation procedure of the system for converting the font of the Chinese character in the image in the embodiment are similar to that of the above-mentioned method for converting the font of the Chinese character in the image, and for related part, reference may be made to the above description, which will not be repeated herein.

Figure 5:
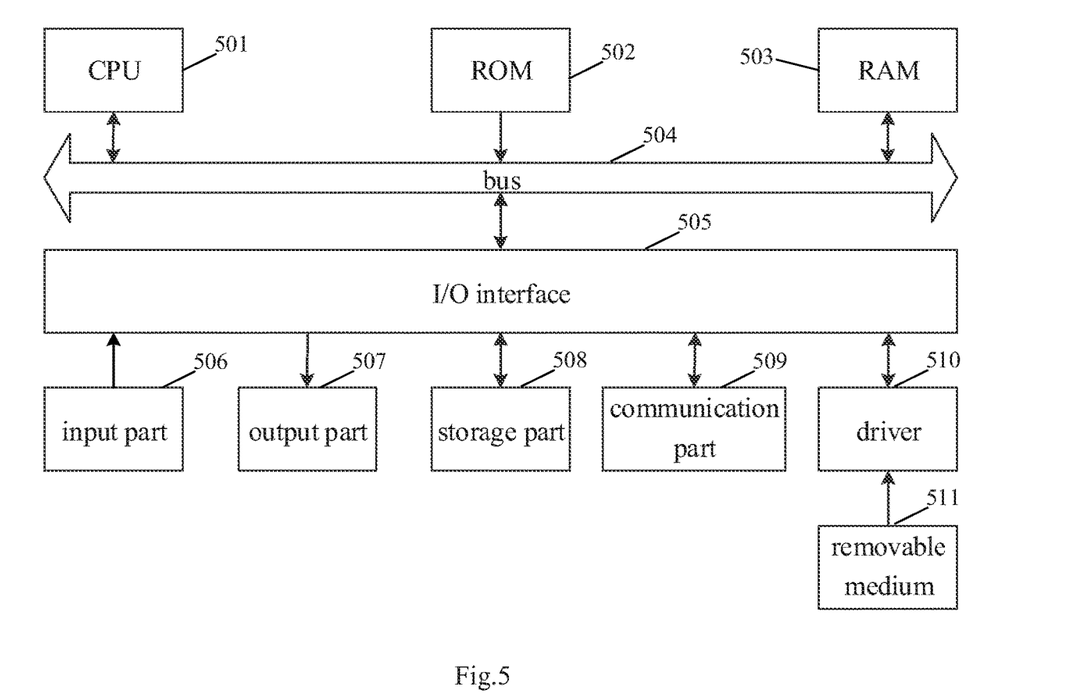
FIG. 5 is a schematic structural diagram of a computer system according to an embodiment of the present disclosure.

As shown in FIG. 5, a computer system suitable for implementing the system for converting the font of the Chinese character in the image of this embodiment includes a central processing unit (CPU) 501, which may perform various appropriate operations and processing according to a program stored in a read-only memory (ROM) 502 or a program loaded from a storage part into a random access memory (RAM) 503. In RAM, various programs and data required for the operation of the computer system are also stored. The CPU, ROM and RAM are connected to each other by a bus 504. An input/output (I/O) interface 505 is also connected to the bus.

The following components are connected to the I/O interface: an input part 506 including a keyboard, a mouse and the like, an output part 507 including a liquid crystal display (LCD), a speaker and the like, a storage part 508 including a hard disk and the like, and a communication part 509 including a network interface card such as a local area network (LAN) card and a modem. The communication part performs communication processing via a network such as Internet. A driver 510 is also connected to the I/O interface as needed. A removable medium 511, such as a magnetic disk, an optical disc, a magneto-optical disc and a semiconductor storage, is installed on the driver as needed, so that a computer program read from the removable medium may be installed into the storage part as needed.

In particular, the process described in the above flow chart may be implemented as a computer software program according to this embodiment. For example, a computer program product is included in this embodiment, and includes a computer program tangibly included on a computer-readable medium, where the computer program includes a program code for performing the method shown in the flow chart. In such an embodiment, the computer program may be downloaded and installed from the network through the communication part, and/or installed from the removable medium.

As another aspect, a non-volatile computer storage medium is further provided in this embodiment. The non-volatile computer storage medium may be a non-volatile computer storage medium included in the above-mentioned system in the above-mentioned embodiment, or a non-volatile computer storage medium that exists alone and is not assembled into the system. The non-volatile computer storage medium stores one or more computer programs. The computer programs are configured to be executed by a device, so that the device acquires a stroke of a to-be-converted Chinese character in the image and spatial distribution information of the stroke; and generates a Chinese character in a target font that corresponds to the to-be-converted Chinese character in the image according to the stroke of the to-be-converted Chinese character, the spatial distribution information of the stroke and standard stroke information of the target font to replace the to-be-converted Chinese character.

It should be appreciated that, a term "include", "have" or any other variation thereof in the present disclosure is intended to encompass non-exclusive inclusion, such that a process, a method, an article or a device including a series of elements includes not only those elements, but also other elements not explicitly listed, or elements inherent to the process, the method, the article or the device. Without more restrictions, an element defined by an expression "including a . . . " does not exclude the existence of other identical elements in the process, the method, the article or the device including the element.

Obviously, the above embodiments in the present disclosure are only exemplifications for illustrative purposes, and are by no means intended to be a limitation on the implementations of the present disclosure. A person skilled in the art may make various modifications or improvements based on the above description, it is not possible to enumerate all embodiments herein, and any obvious modifications or improvements derived from the technical solutions of the present disclosure shall also fall within the scope of the present disclosure.

The invention claimed is:

1. A method for converting a font of a Chinese character in an image, comprising:
   acquiring a stroke of a to-be-converted Chinese character in the image and spatial distribution information of the stroke; and
   generating a Chinese character in a target font that corresponds to the to-be-converted Chinese character in the image according to the stroke of the to-be-converted Chinese character, the spatial distribution information of the stroke and standard stroke information of the target font, to replace the to-be-converted Chinese character;
   wherein prior to the acquiring the stroke of the to-be-converted Chinese character in the image and the spatial distribution information of the stroke, the method further comprises:
      converting the to-be-converted Chinese character in the image into a to-be-converted Chinese character in a standard font; and
   the acquiring the stroke of the to-be-converted Chinese character in the image and the spatial distribution information of the stroke further comprises:
      calculating a correlation degree between each region in the image and a standard stroke of the standard font sequentially in a descending order of a complexity of the standard stroke of the standard font, and matching and identifying the stroke of the to-be-converted Chinese character in the image and the spatial distribution information of the stroke according to the correlation degree, wherein, when a stroke is being identified, a pixel value of a region corresponding to a previous identified stroke is set to zero.

2. The method according to claim 1, further comprising:
   generating an image comprising the standard stroke information of the target font by using a deep learning network, to acquire the standard stroke information of the target font.

3. The method according to claim 1, wherein the calculating the correlation degree between each region in the image and the standard stroke of the standard font sequentially further comprises:
   calculating the correlation degree between each region in the image and the standard stroke of the standard font sequentially according to image blocks of different rotation angles and different sizes.

4. The method according to claim 1, wherein the matching and identifying the stroke of the to-be-converted Chinese character in the image and the spatial distribution information of the stroke according to the correlation degree comprises:
   for any region in the image,
      determining that the region comprises the standard stroke of the standard font in a case that the correlation degree between the region and the standard stroke of the standard font is greater than a preset threshold; and
      determining that the standard stroke of the standard font and the spatial distribution information of the standard stroke are the stroke of the to-be-converted Chinese character in the region and the spatial distribution information of the stroke.

5. The method according to claim 1, wherein the generating the Chinese character in the target font that corresponds to the to-be-converted Chinese character in the image according to the stroke of the to-be-converted Chinese character, the spatial distribution information of the stroke and the standard stroke information of the target font further comprises:
   according to the stroke of the to-be-converted Chinese character and a quantity of strokes and a matching and identifying sequence of the strokes, selecting a corresponding stroke from the standard stroke information of the target font and generating the Chinese character in the target font that corresponds to the to-be-converted Chinese character in the image according to the spatial distribution information of the stroke.

6. A system for converting a font of a Chinese character in an image, the system implementing the method according to claim 1, comprising:
   a character structure acquisition circuit, configured to acquire a stroke of a to-be-converted Chinese character in the image and spatial distribution information of the stroke; and
   a font conversion circuit, configured to generate a Chinese character in a target font that corresponds to the to-be-converted Chinese character in the image according to the stroke of the to-be-converted Chinese character, the spatial distribution information of the stroke and standard stroke information of the target font to replace the to-be-converted Chinese character.

7. A computer device, comprising: a memory, a processor, and a computer program stored in the memory and configured to be executed by the processor, wherein the processor is configured to execute the computer program to implement the method according to claim 1.

8. A non-transitory computer-readable storage medium storing therein a computer program, wherein the computer program is configured to be executed by a processor to implement the method according to claim 1.

9. The method according to claim 2, wherein the generating the image comprising the standard stroke information of the target font by using the deep learning network further comprises:
acquiring the deep learning network by using a plurality of images comprising different Chinese characters in the target font as training samples; and
inputting an image comprising a standard stroke of the standard font to the deep learning network, to obtain the image comprising the standard stroke information of the target font.

10. The method according to claim 2, wherein the deep learning network is a generative adversarial network.

11. The method according to claim 5, wherein the generating the Chinese character in the target font that corresponds to the to-be-converted Chinese character in the image according to the spatial distribution information of the stroke comprises:
acquiring the standard stroke of the target font corresponding to the stroke of the to-be-converted Chinese character sequentially according to the matching and identifying sequence; and
placing, according to the spatial distribution information of the stroke of the to-be-converted Chinese character, the corresponding standard stroke of the target font in the image, to obtain the Chinese character in the target font that corresponds to the to-be-converted Chinese character.

12. The computer device according to claim 7, wherein the processor is further configured to execute the computer program to implement following step:
converting the to-be-converted Chinese character in the image into a to-be-converted Chinese character in a standard font.

13. The non-transitory computer-readable storage medium according to claim 8, wherein the computer program is further configured to be executed by a processor to implement following step:
converting the to-be-converted Chinese character in the image into a to-be-converted Chinese character in a standard font.

14. The method according to claim 11, wherein the spatial distribution information of the stroke comprises: starting point coordinate information, size information and direction information of the stroke.

15. The computer device according to claim 12, wherein the processor is further configured to execute the computer program to implement following step:
generating an image comprising the standard stroke information of the target font by using a deep leaning network, to acquire the standard stroke information of the target font.

16. The computer device according to claim 12, wherein the processor is further configured to execute the computer program to implement following steps:
calculating a correlation degree between each region in the image and a standard stroke of the standard font sequentially in a descending order of a complexity of the standard stroke of the standard font, and matching and identifying the stroke of the to-be-converted Chinese character in the image and the spatial distribution information of the stroke according to the correlation degree, wherein, when a stroke is being identified, a pixel value of a region corresponding to a previous identified stroke is set to zero.

17. The non-transitory computer-readable storage medium according to claim 13, wherein the computer program is further configured to be executed by a processor to implement following step:
generating an image comprising the standard stroke information of the target font by using a deep learning network, to acquire the standard stroke information of the target font.

18. The method according to claim 14, wherein, subsequent to acquiring the stroke of the to-be-converted Chinese character in the image and the spatial distribution information of the stroke, the method further comprises:
representing the to-be-converted Chinese character as a two-dimensional vector, wherein the stroke of the to-be-converted Chinese character and the spatial distribution information of the stroke are used as a first-dimensional vector of the to-be-converted Chinese character, and the quantity and the matching and identifying sequence of the strokes of the to-be-converted Chinese character are used as a second-dimensional vector of the to-be-converted Chinese character.

\* \* \* \* \*